United States Patent [19]

Krøyer

[11] 4,119,434
[45] Oct. 10, 1978

[54] METHOD OF MAKING A BLISTERED SILICATE MATERIAL

[76] Inventor: Karl Kristian Kobs Krøyer, Engtroften 3, DK-8260 Viby J., Denmark

[21] Appl. No.: 819,036

[22] Filed: Jul. 25, 1977

[30] Foreign Application Priority Data

Jul. 28, 1976 [DK] Denmark .............................. 3401/76
Jan. 4, 1977 [DK] Denmark ................................ 17/77

[51] Int. Cl.$^2$ .............................................. C03C 3/22
[52] U.S. Cl. .................................. 106/306; 106/288 B; 106/52; 106/DIG. 1; 65/18; 65/21; 65/33
[58] Field of Search ................. 106/306, 120, DIG. 1, 106/52, 288 B; 65/18, 21, 33

[56] References Cited

U.S. PATENT DOCUMENTS

| 3,266,879 | 8/1966 | Kroyer | 65/21 |
| 3,861,935 | 1/1975 | Ohnemuller et al. | 106/306 |
| 3,942,966 | 3/1976 | Kroyer et al. | 106/52 |

FOREIGN PATENT DOCUMENTS 100,256  11/1964  Denmark.

Primary Examiner—Winston A. Douglas
Assistant Examiner—J. V. Howard
Attorney, Agent, or Firm—Ladas, Parry, Von Gehr, Goldsmith & Deschamps

[57] ABSTRACT

A process for the manufacture of a blistered silicate material having a high content of wollastonite and a low content of cristobalite and containing up to 30 to 40 percent by volume of fine blisters the size of a majority of which are 0.1 to 1mm with a substantial proportion being below 0.1mm wherein raw materials for the silicate material are introduced partly at the upper end of an inclined rotary kiln and partly at the lower end of the rotary kiln, whereby the materials will be distributed in the burning zone and melt.

11 Claims, No Drawings

METHOD OF MAKING A BLISTERED SILICATE MATERIAL

This invention relates to a method of making a blistered silicate material having a high content of wollastonite and a low content of cristobalite, wherein raw materials for the silicate material are introduced partly at the upper end of an inclined rotary kiln and partly at the lower end of the rotary kiln, whereby the materials will be distributed in the burning zone and melt.

It is the object of the invention to provide a silicate material, more specifically a glass material, containing a large number of very fine blisters and having a low content of cristobalite. It is a further object of the invention to provide a material of this type which is well suited as aggregate for ceramics, low temperature ceramics such as mineral-resin matrix and sheet formed products, building materials, road surfacing and similar materials.

Danish Pat. No. 100,256 (British Pat. No. 992,752) teaches a method of making a crystallizable glass material of the said type wherein the raw materials are introduced partly at the upper end of the rotary kiln, partly injected or thrown in from the lower end of the rotary kiln in a way by which a substantial portion of the injected or thrown-in raw materials are distributed over the burning zone. The part of the raw materials injected at the lower end is preferably sand, and the purpose hereof is to give the mixture a raised melting point.

The molten material is withdrawn from the kiln and cooled, preferably by shock cooling in water bath, and crushed. It will then be crystallizable or partly crystallized. The crystallization may be provided or increased by reheating the crushed material and cooling it slowly. The result will be a blistered, granulated material with a rough surface, in that the cleavage faces will preferably pass through the blisters, uncovering numerous cavities.

The known method, however, suffers from the drawback that the finished product has a residual content of free quartz, for instance in the form of cristobalite crystals, which makes it less suitable in the production of building materials, mineral-resin matrix and other materials which when processed may produce unhealthy dust. This risk of pollution might be reduced if the free quartz could be converted to wollastonite, that is a specific form of calciumsilicate crystals.

The present invention is based on the realization that the content of quartz can be bonded to a large extent in the form of wollastonite when the melting is performed as stated in a rotary kiln by injecting according to the invention a calcium-containing additive. The calcium-containing additive may, if desired, be injected simultaneously with or admixed with sand.

The calcium-containing additive may be any mineral having a high calcium content. Particularly suitable according to the invention is calcium sulfate, preferably powdered gypsum. However, any other calcium-containing material may be used instead. Examples hereof are calcium oxide, such as powdered burnt lime, calcium hydroxide, such as slaked lime, and calcium carbonate, such as chalk.

According to the specific embodiment of the invention, fly ash is injected at the lower end of the rotary kiln. Depending on the calcium-content in the fly ash it may then be expedient to inject the fly ash admixed with calcium carbonate or another mineral having a high calcium content.

The amount of calcium-containing additive is preferably adjusted so that the finished blistered silicate material will not contain substantial amounts of cristobalite. Additional amounts may be used, but usually this involves no advantages.

Moreover, it has surprisingly been found that the number and fineness of the air blisters in the granulate will be substantially increased by the method according to the invention and that the said effect can be even further increased by increasing the rate of rotation of the kiln. This results in additional comminution of the blisters. A particularly favourable effect will be obtained by adjusting the rate of rotation to approximately 45 seconds per revolution as compared with the normal rate of approximately 70 seconds per revolution. The result will be approximately twice as many blisters beyond the increase caused by the injection of gypsum. As a result of the lesser size of the air or gas bubbles they will be less inclined to excape the molten phase.

The injection of gypsum, as stated above, increases the development of gas, in that the calcium sulfate is cleaved to form gaseous sulfur oxides which promote the blister formation. On account of the very large number of fine bubbles formed in this way, the crushing will produce a granulate of great surface roughness because the cleavage faces will preferably extend through the bubbles and divide them so that the faces present numerous cavities or recesses.

While it was thus previously possible by means of a glass mass of a composition corresponding to a specific weight of 2.7 and by injecting sand in an amount of about 13–20% of the molten glass mass, to obtain a product containing approximately 15% by volume of bubbles, a major part of which were of the size 0.2–1 mm, it is now possible by injection of about 2–3% of calcium sulfate calculated on the molten mass to obtain up to 30–40 percent by volume of fine blisters a major part of which are of the size 0.1–1 and a considerable proportion even below 0.1 mm.

The method according to the invention provides a product containing, if calcium sulfate has been used, no or but faint traces of free calcium sulfate and particularly suitable for introduction into (1) low-temperature ceramics, disclosed by the specification of U.S. Ser. No. 759,226 filed Jan. 13, 1977

(2) mineral-resin matrix, disclosed by the specification of U.S. Ser. No. 798,980 filed on May 20, 1977

(3) sheet-formed products, disclosed by the specification of U.S. Ser. No. 804,821 filed on June 8, 1977.

Besides, the material is very suitable for road surfacing and in the production of sand-lime bricks. When used as road surfacing the insulating effect will be improved (increased k-value). This impedes the tendency to glazing.

Moreover, the increased surface roughness will resist the subsiding of the grains in asphalt and cause higher friction to driving vehicles.

The applicability of the product for the above mentioned purposed is particularly conditioned on the provision of cut blisters by the crushing of the products, which ensures a specifically good anchoring, so that it is actually prssible to produce very strong f.inst. mineral-resin matrix with a content of only 3–10% of resin.

The method involves the further considerable process-technical advantage that the injection of calcium sulfate on to the walls in the burning zone of the kiln causes the formation of a foam which provides an improved protection of the fireproof lining in the rotary kiln as compared with the prior method.

It has been found that by a method of the type described it is possible to obtain blistered silicate materials having similar good properties, in which the quartz content is also to a great extent bonded as wollastonite and in which the number and fineness of bubbles have also been increased, if at the lower end of the kiln there is injected, instead of gypsum, the so-called fly ash which is produced in large quantities, particularly from coal-burning power stations.

Fly ash usually contains considerable amounts of unburned carbon, frequently from about 10 to 30 percent, as well as various inorganic components, especially oxides, whose composition depends on the kind of fuel used. Thus, a typical fly ash from the power station of Studstrup at Aarhus has the following composition according to the plant:

| Volatile materials | 17.93% |
|---|---|
| $SiO_2$ | 55.9% |
| $Al_2O_3$ | 4.16% |
| $Fe_2O_3$ | 10.6% |
| CaO | 19.1% |
| MgO | 3.31% |
| $P_2O_5$ | 0.23% |
| $SO_3$ | 1.17% |
| $TiO_2$ | 0.18% |
| $K_2O$ | 0.36% |
| $Na_2O$ | 0.17% |
| $Li_2O$ | 96 ppm |

The carbon content of fly ash presents several interesting aspects in a method of the type disclosed.

The liberation of gas in the combustion of carbon contributes advantageously to the desired formation of fine blisters in the end product.

In addition, the carbon content is utilized in the combustion process for heating the kiln and melting the raw materials whereby a substantial energy saving is obtained, frequently of up to 20-35%.

Finally, the use of fly ash permits the preparation of a black, blistered product.

This is of specific importance when preparing material for roofings. The prior black roofings have usually been subjected to a dyeing which is often cumbersome and/or not fast.

The dark colour may i.a. provide improved utilization of solar heat which may in the long term be of significance to the fitting up of low-energy houses. It has been difficult to produce such black materials by the prior art methods described above. It may also be mentioned that the production of black glass in the so-called Wanne ovens is extremely difficult and/or very costly.

The applicable amounts of fly ash in the method according to the invention vary within wide limits, i.a. as a function of the mineral composition of the ash which may wholly or partly replace one or more of the usual raw materials such as sand, chalk and dolomite. To achieve the necessary meltability of the raw materials and obtain the desired reduction of the cristobalite content, it will often be expedient to introduce the fly ash admixed with a minor amount of calcium carbonate, especially in the form of chalk, for example in a mixture proportion of 80 parts by weight of fly ash to 20 parts by weight of chalk.

The fly ash, possibly admixed with chalk, is preferably injected over a relatively long zone at the lower end of the kiln, and possibly admixed with the oil used for heating the kiln. The material which is not caught by the melt in the kiln will, after passing the kiln, be caught by the filters as dust which may be recirculated to the kiln in a manner known per se.

The use of fly ash presents the additional advantage over conventional sand injection that the $SiO_2$ content occurs as particles having very small grain size finely dispersed in the ash which facilitates the assimilation in the melt.

If desired, a portion of the partly crystalline material removed from the rotary kiln may be recirculated and injected at the lower end of the kiln together with powdered gypsum or fly ash.

This involves the advantage that the material acts as crystal nucleus in the subsequent crystallization and that, on account of the open blisters on the surface, it is possible to introduce more blisters in the mass than might be obtained by using a similar amount of sand.

Finally, the crystallized material also contributes to protect the kiln lining on account of its high melting point.

The method according to the invention will be illustrated by the following example.

EXAMPLE

In a rotary kiln of a type known per se sand, chalk and dolomite were introduced continuously at the upper end of the kiln. Simultaneously sand in an amount of about 15% and gypzum in an amount of about 2% calculated on the total amount of raw materials were injected at the lower end of the kiln adjacent to the burning zone, 6-8 $m$ from the discharge, while the kiln was rotated at a rate corresponding to approximately 45 seconds per revolution. The proportion between sand, chalk and dolomite was adjusted to provide the following composition of the end product:

$SiO_2$ : 65%
CaO : 27.9%
MgO : 2.1%
$Al_2O_3$ : 3.1%
$Fe_2O_3$ : 0.4%
$K_2O$ : 0.5%
$Na_2O$ : 0.5%
Rest : various impurities etc.

The molten mass was cooled in water bath and crushed.

What I claim is:

1. A process of making blistered crystallizable glass material having a high content of wollastonite and a low content of cristobalite comprising the steps of continuously supplying part of a selected composition of raw materials suitable for forming a crystallizable glass material to the upper end of an inclined rotary kiln, keeping said rotary kiln at a temperature sufficient to melt the raw materials supplied to the upper end thereof during their passage therethrough to form a molten bath flowing downwards through the lower part of said rotary kiln, continuously injecting the remainder of said selected composition of raw materials comprising at least one calcium-containing additive from the lower end of said rotary kiln in the form of a blast striking the wall of said rotary kiln above said molten bath over the whole of the burning zone of said rotary kiln, thereby to protect the lining of said rotary kiln and gradually to be incorporated in said molten bath under conditions to cause blister formation and causing the molten material thus formed to flow off from the lower end of said rotary kiln.

2. A method according to claim 1, wherein the calcium-containing additive is calcium sulfate.

3. A method according to claim 1, wherein the calcium-containing additive is fly ash.

4. A method according to claim 2 wherein calcium sulfate is injected at the lower end of the rotary kiln in the form of powdered gypsum.

5. A method according to claim 4, wherein sand and powdered gypsum are injected simultaneously at the lower end of the kiln.

6. A method according to claim 3, wherein the fly ash is injected admixed with calcium carbonate or some other mineral having high calcium content.

7. A method according to claim 1, wherein the rate of rotation of the rotary kiln is adjusted to approximately 45 seconds per revolution.

8. A method according to claim 1, wherein the partly crystalline material removed from the rotary kiln is recirculated by being injected at the lower end of the rotary kiln together with the calcium-containing additive.

9. A blistered silicate material having a high content of wollastonite and a low content of cristobalite, which contains up to 30 to 40 percent by volume of fine blisters the size of a majority of which are 0.1 to 1 mm with a substantial proportion being below 0.1 mm.

10. A blistered silicate material which comprises 65% $SiO_2$, 27.9% $CaO$, 2.1% $M_gO$, 3.1% $Al_2O_3$, 0.4% $Fe_2O_3$, 0.5% $K_2O$, 0.5% $Na_2O$ and the balance of various impurities.

11. In a process for making a crystallizable silicate glass material by burning raw materials in a rotary kiln wherein the raw materials are introduced partly at the upper end of the rotary kiln and partly injected in from the lower end of the rotary kiln in such manner that a substantial portion of the injected in materials are distributed over the burning zone, the improvement which resides in incorporating in the raw material injected at the lower end a calcium-containing additive selected from the group consisting of calcium sulfate and fly ash whereby to produce a product having a high wollastonite content.

* * * * *